United States Patent [19]

Settineri et al.

[11] 4,105,841
[45] Aug. 8, 1978

[54] TREATMENT OF INTERIOR SURFACES OF POLYMERIZATION REACTORS TO RETARD POLYMER BUILDUP

[75] Inventors: William J. Settineri, Midland; Milton C. Tolly, Hope, both of Mich.

[73] Assignee: The Dow Chemical Company, Midland, Mich.

[21] Appl. No.: 773,090

[22] Filed: Feb. 28, 1977

Related U.S. Application Data

[63] Continuation-in-part of Ser. No. 684,225, May 7, 1976, abandoned.

[51] Int. Cl.² ............................................. C08F 10/00
[52] U.S. Cl. ...................................... 526/62; 427/230
[58] Field of Search ................................. 526/62, 74; 260/652.5 P, 79.5 NV; 427/230

[56] References Cited

U.S. PATENT DOCUMENTS

| | | | |
|---|---|---|---|
| 2,136,348 | 11/1938 | Wiley | 260/652.5 P |
| 2,837,506 | 6/1958 | Myers | 526/62 |
| 2,942,037 | 6/1960 | Aldwyn | 260/652.5 P |
| 3,778,423 | 11/1973 | Reiter | 526/62 |
| 3,901,755 | 8/1975 | Martin | 260/79.5 NV |

Primary Examiner—Ronald H. Smith
Assistant Examiner—Sam Silverberg
Attorney, Agent, or Firm—Ronald G. Brookens

[57] ABSTRACT

A process for retarding undesirable buildup of polymeric material on the internal surfaces of reactors used in the polymerization of substantially water-insoluble ethylenically unsaturated monomer, particularly vinyl chloride monomer, and for significantly reducing the tendency of reactor contents to foam during deoxygenation of such contents prior to subsequent polymerization reactions, such process comprising introducing sulfur trioxide into the reactor in an amount sufficient to provide at least about 0.045 grams of sulfur trioxide per gallon of reactor volume.

5 Claims, No Drawings

TREATMENT OF INTERIOR SURFACES OF POLYMERIZATION REACTORS TO RETARD POLYMER BUILDUP

This application is a continuation-in-part of copending application Ser. No. 684,225, filed May 7, 1976 (now abandoned).

BACKGROUND OF THE INVENTION

The polymer manufacturing industry, and particularly the polyvinyl chloride industry, which produces most of its products by the suspension polymerization of monomeric materials, has long been plagued by the need to prevent undesirable polymer buildup on the interior surfaces of reaction vessels. This polymer buildup is of such a nature as to require frequent cleaning necessitating a complete shutdown of the polymerization reactors. The polymer buildup, if not removed, will slough off the reactor walls into the reaction mixture, causing "gels" in the polymeric product. Polymer buildup removal procedures cost the industry millions of dollars yearly, and have been calculated to reduce the industry's commercial production capacity by up to 15 percent. In addition to cost and downtime the industry is faced with the problem of containment of potentially toxic monomeric materials resulting from repeated opening of reactors for cleaning purposes. Consequently, the polymer manufacturing industry is very interested in reducing or eliminating the polymer buildup problem.

Various treatments have been proposed to combat such polymer buildup. U.S. Pat. No. 3,825,434 teaches the use of hydrophilic films on the internal surface of polymerization reactors. Polyvinyl alcohol, gelatin, methyl cellulose, carboxymethyl cellulose, polyethylene oxide, polyvinyl pyrrolidone, polyacrylic acid and other polyelectrolytes such as polymethacrylic acid, polyethacrylic acid, polychloroacrylic acid, polycrotonic acid and polycyanoacrylic acid are named in the process of the above-specified patent. U.S. Pat. No. 3,575,079 teaches the treatment of reactor surfaces with an aqueous solution of one or more water-soluble derivatives certain amino carboxylic acids selected from the group consisting of mono- and polycarboxylic acids. U.S. Pat. No. 3,849,179 employs coatings of polyethylenimine to retard polymer buildup but teaches the need for a very clean surface prior to application of such coating In what seems to be direct contradiction to the above teaching for use of hydrophilic surfaces, U.S. Pat. No. 3,778,423 discloses the use of alpha-methylstyrene as a reactor coating material to inhibit buildup in polyvinyl chloride suspension polymerization processes. Such treatment is economically undesirable, however, and is not as effective as the treatment contemplated by the present invention. More particularly, the gas phase treatment of the present invention provides a more uniform contact with the interior surfaces of the reactor.

Accompanying the problem of polymer buildup on the walls of the reactor is the additional complication which centers around the tendency of the reactor contents to foam during removal of oxygen from the aqueous portion of the reaction mixture prior to introduction of monomer.

Notwithstanding the fact that prior known processes render improvements in the prevention of polymer buildup, such processes do not resolve the problem of foaming of reactor contents during oxygen purge of the reactor prior to subsequent polymerization reactions nor do they provide suitable means for treatment of an uncleaned polymerization reactor which treatment enables substantially uninterrupted continuation of commercial production.

Accordingly, it is an object of this invention to provide a process for eliminating or retarding the buildup of polymeric material on reactor walls during polymerization of substantially water-insoluble ethylenically unsaturated monomer.

Another object is to provide a means for effectively affixing a hydrophilic coating onto the reactor walls without the necessity of carefully applied primer coats and/or the use of thermal curing steps for such hydrophilic coatings.

It is another object of the present invention to reduce the tendency of the reactor contents to foam during oxygen purge of the reactor prior to subsequent polymerization reactions.

SUMMARY OF THE INVENTION

The above and related objects are accomplished by utilization of a process comprising introducing sulfur trioxide into a polymerization reactor in an amount sufficient to provide at least about 0.045 gram of sulfur trioxide per gallon of reactor volume.

DESCRIPTION OF THE PREFERRED EMBODIMENTS

The process of the present invention is particularly adapted for the suspension polymerization of vinyl chloride monomer as well as interpolymers of vinyl chloride. Exemplary of such interpolymers are copolymers of vinyl chloride and vinyl alkanoates such as vinyl acetate and vinyl proprionate; and copolymers of vinyl chloride and vinylidene chloride.

The process can be advantageously utilized in conjunction with any conventional polymerization technique such as batch, semi-continuous and continuous polymerization procedures as well as phase inversion techniques such as described in U.S. Pat. No. 3,706,722. The process is also applicable to polymerization techniques utilized in the preparation of plastisol resins, such as the vinyl chloride plastisols. Furthermore, the process can be applied to clean, substantially clean or dirty reactors, i.e., polymerization reactors already containing polymerized material adhered to the internal surfaces thereof. In this regard, periodic utilization of the process of the present invention is very effective in reducing the necessity for opening and cleaning such polymerization reactors.

In carrying out the process of the present invention the interior surfaces of the polymerization reactor are preferably dried prior to introduction of sulfur trioxide, thus preventing conversion of excessive amounts of sulfur trioxide to sulfuric acid. It is to be noted, however, that the presence of small amounts of sulfuric acid may serve as a means of cleaning the reactor surfaces, particularly those surfaces not having a polymer coating thereon. Any suitable method may be used to dry the reactor surfaces such as air drying; radiant heating and the like. Preferably, the dew point inside of the reactor to be treated is maintained at a value of 20° C or below.

The sulfur trioxide may be introduced into the reactor interiors by any method which permits such material to substantially uniformly contact the interior reactor surfaces. A preferred method involves charging a closed evacuated reactor with a measured amount of sulfur trioxide delivered through a reactor port. This approach allows a fixed amount of sulfur trioxide to be used and has the additional advantage in that the treatment occurs in a closed system, thereby minimizing potential for human contact. The amount of sulfur trioxide applied to the interior reactor surfaces is not critical so long as at least about 0.045 gram of sulfur trioxide per gallon of reactor volume is introduced. Amounts of sulfur trioxide less than this are generally ineffective in providing effective resistance to polymer buildup. The amounts of sulfur trioxide required for optimum effectiveness will depend on reactor size (surface to volume ratio) and water dew point of the atmosphere inside the reactor. Optimum results are generally realized by introduction of from about 0.045 to about 10 grams of sulfur trioxide per gallon of reactor volume while maintaining a water dew point within the reactor at a value not in excess of about 20° C. Added amounts of sulfur trioxide can be used under such conditions but are unnecessary and wasteful. Reactors having a water dew point in excess of 20° C may also be treated in the manner prescribed by the present invention, but require the introduction of larger amounts of sulfur trioxide, e.g. sufficient sulfur trioxide to provide a mole of sulfur trioxide per each mole of water in the vapor phase.

Following the introduction of vaporous sulfur trioxide, the interior surfaces of the reactor are beneficially flushed with water. Such procedure tends to remove any oily sulfuric acid which may be present and thus prevent the formation of undesirable corrosion of the reactor surfaces.

The sulfonated interior reactor surfaces may also be neutralized, if desired, before proceeding with additional polymerization reactions, although such neutralization step is not critical to the present invention. Neutralization may be accomplished through utilization of basic compounds such as ammonia, sodium carbonate, sodium hydroxide, lithium hydroxide, potassium hydroxide, calcium hydroxide, and ammonium hydroxide, with sodium hydroxide generally being preferred.

Furthermore, it is desirable to maintain the interior reactor surfaces, during treatment with sulfur trioxide, at temperatures less than about 95° C, and preferably between about 25° C and 90° C.

Normally, in the commercial preparation of suspension polymerized ethylenically unsaturated monomer, such as vinyl chloride, oxygen is removed from the water, suspending agent, or initiator mix by reduced pressure. This causes foaming of the contents which must be overcome by the use of antifoam materials. It has been found that stirring under this reduced pressure aggravates the foaming. It has unexpectedly been found, however, that when the interior portions of the reactor are treated by the process as contemplated by the present invention, a marked reduction in the foaming characteristics of the contents is noted, thereby eliminating the need for antifoaming agents. Furthermore, if the contents are stirred the foaming is even more markedly reduced.

The following examples illustrate specific modes of practicing the invention.

EXAMPLE I

A. Coating Reactor Surfaces

A 3.5 liter reactor, comprising a glass tube and stainless steel pot, was precoated with polyvinyl chloride and subsequently treated with sulfur trioxide to prevent the deposition of polyvinyl chloride onto the reactor interior during subsequent polymerization reactions. The agitator and baffle in this reactor were of stainless steel. The procedure employed was as follows.

All portions of the reactor interior were rinsed twice with clean tetrahydrofuran (THF) and scoured to remove any traces of previous use. Before charging, the entire reactor interior was flushed twice more with clean THF and dried. The reactor was charged with 1500 g of deionized water, 130 g of 1 percent METHOCEL ® 60 HG (50 cps) in water and 3 g of lauroyl peroxide. Oxygen was removed by alternate treatment of vacuum and nitrogen pressure. The reactor was then charged with 570 g of vinyl chloride monomer and the temperature brought to and held at 54° C for 3 hours. At this point the reactor was cooled, unreacted vinyl chloride removed, and the contents dumped. A spray of deionized water was used to wash down any loose clinging polymer on reactor parts. A light amount of polyvinyl chloride was adhering to the interior surfaces of the reactor at this point. Conversion of vinyl chloride to polyvinyl chloride had proceeded to about 6.5 percent.

The reactor was then air dried and a spigot placed at the bottom thereof to receive sulfur trioxide vapors in an air stream which stream was obtained by sparging dry air through fuming sulfuric acid (30% $SO_3$) which was maintained at a temperature of 60° C. The rate of flow through the reactor was 6,000 ml/minute and the reactor was held at room temperature. After this exposure the lines and reactor were purged with nitrogen to remove sulfur trioxide. Deionized water was used to rinse the inside of the reactor, and finally the reactor interior was neutralized by the addition of 0.003N NaOH solution.

B. Observation of Polymer Buildup

Eleven normal polymerizations were performed in the reactor treated as per (A) above using the following charge and procedure.

Charge 65 g of 1% solution in water of METHOCEL ® 60 HG (50 cps); 1.71 g of lauroyl peroxide; 1083 g deionized water.

$O_2$ Purge by alternate application of vacuum and nitrogen pressure. At this point, even under stirring, an unexpected extremely low tendency for contents to foam was observed.

Charge 570 g of vinyl chloride monomer.

Polymerized at 54° C for ~21 hours.

Polymerizations 1 through 5 were characterized by clean almost spotless reactor parts including paddles and baffle; whereas polymerizations 6 through 11 evidenced a slow trend toward significant polymer buildup.

EXAMPLE II

A pressure reactor as described in Example I was precoated by running a partial polymerization of vinyl chloride, dumping the contents and drying the reactor one hour at reduced pressure. The deposited polymer was sulfonated by injecting 1.5 cc of liquid sulfur trioxide from a syringe through a rubber septum into the evacuated reactor. An estimated contact time of 15–20 seconds was allowed, followed immediately by a blowing out of the reactor. This was directly followed by two deionized water washes and neutralization of the sulfonic acid groups with 0.003N NaOH.

Polymerization of vinyl chloride monomer was done as described supra with regard to polymerizations 1 through 11. The reactor internal surfaces were in a very clean condition with almost no polymer buildup observed.

EXAMPLE III

An experiment was performed in the manner as set forth in Example II above except that 0.5 cc of liquid sulfur trioxide was used. This also resulted in a clean buildup free reactor.

In both of the above examples sulfonation by this technique resulted in an excessive attack by the sulfur trioxide on deposited polyvinyl chloride near the inlet port. However, by following the sulfonation with thorough water washing, excellent results were obtained in preventing polymer buildup.

EXAMPLE IV

One pint aerosol cans were loaded with 18 grams of liquid sulfur trioxide and crimped tightly shut. The can was fitted with valving to allow inflow of Freon-12. 269 Grams of Freon-12 were passed into the can by means of nitrogen pressure.

A pressure reactor as described in Example I was precoated with polyvinyl chloride using the precoating suspension polymerization described above. After water washing to remove all loose material the reactor was dried under reduced pressure at 45° C. 50 Grams of sulfur trioxide/Freon solution were flowed into the evacuated reactor (3.13 grams of sulfur trioxide) until the total pressure in the reactor was 22 psi gauge. Contact time in the reactor was approximately 15 seconds at which time reactor contents were vented and the reactor purged with nitrogen. The reactor was flushed two times with water and sulfonic acid ($SO_3H$) groups neutralized with 0.003N NaOH.

A normal suspension polymerization of polyvinyl chloride was performed in this reactor and resulting polymer buildup was very light to nil. This approach to delivery of sulfur trioxide solves a number of sulfur trioxide handling problems, allows quantitative injection of sulfur trioxide into the reactor and utilizes much less total sulfur trioxide than a method which flows it through the reactor for a time interval. Additional experiments indicated that substantially equivalent results were obtained wherein the neutralization step was eliminated.

EXAMPLE V

A similar experiment as above was performed wherein the aerosol can was charged with 1.8 grams of sulfur trioxide and 200 grams of Freon-12. The reactor sulfonation was carried out by flowing the sulfur trioxide/Freon solution into the evacuated (28" of Hg) reactor till the pressure was 30 psig. This consumed 54 grams of sulfonating solution and 0.5 gram of sulfur trioxide. This charge was held in the reactor for about 5 minutes. The rest of the experiment and trial polymerization were just as above and showed little to no buildup.

EXAMPLE VI

Polyvinyl chloride discs, having been exposed to sulfur trioxide for varying periods of time, then washed with deionized water and neutralized with 0.03N NaOH were mounted in a 3.5 liter pressure reactor and exposed to a suspension polymerization of vinyl chloride. These discs were mounted just below the liquid level in all cases. A separate polymerization was carried out for each sample. Recorded below are data indicating that the amount of sulfur reacted on the discs was not of particular criticality so long as the treatment provided at least about 1 microgram of sulfur per square inch of coating surface and providing such treatment did not result in destruction of or severe attack on the base coating.

| Disc # | Sulfur ($\mu$ grams/in$^2$) | Observations After Polymerization |
|---|---|---|
| 1 | 0.0 | Sample covered with PVC adhering tightly. |
| 2 | 2±1 | Some PVC on disc but easily removed - no adherence to disc. |
| 3 | 9±1 | " |
| 4 | 34±5 | " |
| 5 | 540±80 | " |

EXAMPLE VII

This example demonstrates that a polyvinyl chloride base coat may be applied by deposition from a lacquer. Since tetrahydrofuran is a good cleaning solvent for polyvinyl chloride reactors, a 3.5 liter, stainless steel pot, glass tube pressure reactor was allowed to build up a coating of polyvinyl chloride during a normal polymerization. This coating was thoroughly cleaned away using tetrahydrofuran solvent. When the solvent (found to be carrying 0.341% polymer solids) was drained from the reactor, some polymer was necessarily deposited as a uniform coating on reactor internals.

After air drying, 5% sulfur trioxide in dry air stream was flowed through the reactor for 3 minutes. The coating was washed with deionized water and neutralized with 0.003N sodium hydroxide. A normal suspension polymerization of vinyl chloride resulted in a reactor with very little polymer buildup. Any buildup which formed showed no real adhesion to the reactor internals whereas that formed in unsulfonated control runs showed significant adhesion to the stainless portions of the reactor.

The following are examples of base coatings for reactors other than where polyvinyl chloride buildup is used as a prime coat.

EXAMPLE VIII

This approach was to coat stainless coupons with a sulfonated polyphenylene sulfide and to mount them in a pressure reactor during a polyvinyl chloride polymerization. Visual inspection of sulfonated polyphenylene sulfide and unsulfonated polyphenylene sulfide was used to determine if the sulfonated polyphenylene sulfide surface improved resistance to polyvinyl chloride deposition or buildup.

Ryton type V-1 polyphenylene sulfide powder from Phillips Petroleum Co. was slurried in methylene chloride and charged into an aerosol can under Freon pressure. ½ inch Diameter × 2 inches long stainless steel cylinders were preheated to about 370° C and sprayed with the polyphenylene sulfide powder to form a coating on the coupons. The coatings were cured for 30 minutes at 370° C. Sulfonation was carried out by exposing coupons to a mixture of 7% sulfur trioxide in dry air for one minute followed by a water wash. Two of these treated coupons were mounted in a 3.5 liter pressure reactor along with a control coupon which was coated with a nonsulfonated polyphenylene sulfide. A polyvinyl chloride polymerization was carried out as described previously and contents of the reactor dumped. After a water wash, the condition of the coated coupons could be visually observed. Even though the reaction left large amounts of polymer buildup, on the reactor internals, the two coupons which were sulfonated were quite free of buildup while the unsulfonated coupon had been completely covered with polymer buildup.

EXAMPLE IX

The compounds illustrated below were used in the following two part coating system.

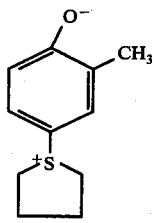

Compound I

Tetrahydro-1-(4-hydroxy-3-methylphenyl)thiophenium hydroxide inner salt

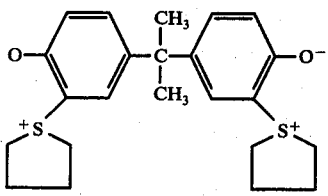

Compound II 1,1'-(isopropylidene bis(6-hydroxy-m-phenylene)bis(-tetrahydrothiophenium hydroxide)bis(inner salt)

For test purposes the coating was applied to stainless steel cylinders which were ½ inch in diameter by 2 inches in length.

| Part I of Coating System |
|---|
| 60% by weight of Compound I above |
| 38% by weight of Compound II above |
| ~2% of Dow Corning coupling agent Z6020 |
| ~0.1% 3M surfactant F.C. 134 |

The above components at a total 2% by weight were dissolved in a 10% ethanol-90% water solvent system. Two coats of this primer were applied with ½ hr. of drying at 100° C between coats.

Part II of Coating System

Part II of this coating system was made of 1% of Compound II (above) in n-butanol. This was painted over part I and cured at 100° C for ½ hr.

The coupons were exposed to a normal suspension polymerization of vinyl chloride as described previously. All parts, coated and uncoated, were covered with a large amount of polymer buildup. The prime system as described above was placed on cleaned coupons and also on the stainless surfaces of the reactor impeller and shaft. All coated parts were sulfonated by immersing for 2½ minutes in 30% fuming sulfuric acid at 25° C. After a water wash, these parts were exposed to a normal suspension polymerization of vinyl chloride.

Visual examination of the coated parts, after removing reactor contents, showed very clean surfaces free of polyvinyl chloride buildup.

It is emphasized that any prime coating can be utilized herein which coating is substantially water-insoluble, inert to the polymerization reaction, adheres to the internal surfaces of the polymerization reaction and which may be sulfonated to the extent described herein. In this regard, the process further contemplates the use of sulfonated polyvinyl chloride as a prime coat which coat may then be covered by a second hydrophilic coating.

EXAMPLE X

Polyvinyl chloride was prepared using a phase inversion technique as described in Example 1 of U.S. Pat. No. 3,706,722, issued Dec. 19, 1972 (the described procedure being exemplary of the invention as claimed by said patent). Such polymerization resulted in the formation of a large amount of polyvinyl chloride tightly adhered to the interior reactor surfaces and which was generally in the form of membrane on said interior reactor surfaces. The polymerization reactor was then treated with sulfur trioxide as set forth in Example IV herein and a second polymerization (using the same technique) was completed. Examination of the interior surfaces of the reactor, following said second polymerization reaction, showed very little additional polymer buildup on such surfaces.

EXAMPLE XI

A 4000 gallon, glass lined reactor, used in the manufacture of suspension polymerized polyvinyl chloride, was cleaned by the conventional technique of contacting the interior surfaces thereof with high pressure (3000 to 4000 psi) water lancing, followed by mechanically hand scraping such surfaces to remove residual polyvinyl chloride. After cleaning, a suspension polymerization of vinyl chloride monomer was completed, followed by dumping the polymeric material and flushing the reactor with water. The reactor was then dried over an 8 hour period by passing air therethrough while maintaining the reactor walls at a temperature of about 60° C. At this point, the internal surfaces of the reactor were lightly covered with an adherent coating of polyvinyl chloride. The reactor was then evacuated (to about 22 inches of Hg) and maintained at a temperature of about 55° C. Thereafter, 4 pounds of liquid sulfur trioxide was placed in a stainless steel cylinder. Steam heating of such cylinder and purging thereof with a nitrogen stream permitted the sulfur trioxide to vaporize and pass through a line into the top of the reactor. The sulfur trioxide was passed into the reactor over a period of about 15 minutes and was held in contact with the internal surfaces of such reactor over an additional period of 12 minutes. At this time, about 200 gallons of low pressure water was sprayed from nozzles located within the reactor, onto the internal surfaces of the reactor. The water from such spray was then removed and the reactor filled with water, the pH of which was adjusted to about 13 by the addition of sodium hydroxide. The water was then drained and the reactor flushed again with water. This reactor was normally cleaned by water lancing and hand scraping every two to five polymerizations to maintain a reasonable amount of polymer buildup (i.e., to maintain the polymer buildup to a point where off-grade polymer particles do not contaminate the manufactured product). By way of comparison, when the reactor was treated with sulfur trioxide as described above, 38 polymerization reactions were completed (with a water rinse at 100 to 200 psi, following each reaction) before cleaning by water lancing and hand scraping was required.

EXAMPLE XII

In each of a series of experiments, a 4000 gallon, glass-lined reactor as described in Example XI was cleaned and coated as per the procedure set forth in Example XI, but using a drying time of from 2 to 3 hours at a temperature of about 70° C, along with varying amounts of sulfur trioxide. The following table sets forth the pounds of sulfur trioxide used and the effect of such treatment:

| Pounds of Sulfur Trioxide Used | Color of PVC on Internal Reactor Walls | No. of PVC Polymerizations Before Normal Clean out is Required |
|---|---|---|
| 0 | — | 2–5 |
| 2 | Tan-brown | 8 |
| 3 | Black | 14 |
| 4 | Black | 38 |

EXAMPLE XIII

A 4000 gallon, glass-lined polymerization reactor previously used for suspension polymerization of polyvinyl chloride, was cleaned prior to treatment with sulfur trioxide in the manner set forth in Example XI with the exception that such reactor was dried for a period of only 1.5 hours. After drying, the reactor was closed and evacuated to 22 inches of Hg and maintained at a temperature of about 50° C. A maximum water dew point of 0° C was determined by observing a cooled surface of the interior of the reactor through an observation sight glass.

Thereafter, 4 pounds of sulfur trioxide were charged to the reactor over a 15 minute period, with the sulfur trioxide being retained in the reactor for an additional period of about 5 minutes. The reactor was then flushed with water from a low pressure water source, and the reactor placed on a production schedule at this point. Twenty-four production batches were completed in the treated reactor before conventional water lancing and hand scraping was required to remove excessive polymer buildup. The treatment with sulfur trioxide produced an excellent release surface and allowed the reactor to be effectively flushed with low pressure water following each of the production runs. Even after the 24 production cycles a continuing benefit of treatment was observed in that subsequent cleaning was made easier, particularly at trouble spots such as the dump valve area.

This experiment illustrates that neutralization of the reactor is unnecessary following treatment of such reactor with sulfur trioxide.

EXAMPLE XIV

A 4000 gallon, glass-lined reactor used for the suspension polymerization of polyvinyl chloride was removed from production and cleaned by water lancing with 4000 p.s.i. water, followed by hand scraping of the internal reactor surfaces. The reactor was then dried at a temperature of about 60° C for a period of about 3 hours by passing air through the cleaned reactor. The reactor was then closed and evacuated to 22 inches of Hg. At this point, a maximum dew point of 0° C was measured by observation of a cooled surface within the reactor. Thereafter, 4 pounds of sulfur trioxide were charged into the reactor while maintaining the temperature within the reactor from about 50° C to about 60° C.

The total contact time of the sulfur trioxide within the reactor was 20 minutes. The reactor was then flushed with about 200 gallons of low pressure water. Sixteen consecutive production runs were completed before the reactor required cleaning by high pressure water lancing and hand scraping. Each such production run was followed by flushing with low pressure water, wherein most of the polymer buildup was easily removed.

This example illustrates that precoating of the reactor with a polymeric prime coat prior to the treatment with sulfur trioxide, is not critical to the process of the present invention.

EXAMPLE XV

A 4000 gallon, glass-lined reactor used for the suspension polymerization of polyvinyl chloride was removed from production and cleaned by water lancing with 4000 p.s.i. water, followed by hand scraping of the internal reactor surfaces. The reactor was then dried at a temperature of about 60° C for a period of about 3 hours by passing air through the cleaned reactor. The reactor was then closed and evacuated to 22 inches of Hg. Thereafter, 4 pounds of sulfur trioxide were charged into the reactor over a 10 minute period and held in the reactor for an additional 5 minutes while maintaining the temperature within the reactor from about 50° C to about 60° C. The reactor was then flushed with about 200 gallons of low pressure water. Six consecutive production runs were completed, wherein the reactor was flushed after each run by use of an internally positioned water spray, before significant polymer buildup was observed within the reactor.

This example illustrates that the process of the present invention can be used without requiring opening of the reactor over an extended production schedule, thereby providing considerably savings in reactor down time and significantly reducing exposure of personnel and the environment to toxic vinyl chloride monomer vapors.

EXAMPLE XVI

In each of a series of experiments, into a 3.5 liter glass tube - stainless pot reactor was charged 1071 grams of deionized water, 2.7 grams lauroyl peroxide annd varying amounts of an aqueous solution containing 2% by weight of methylcellulose. The reactor was then purged with nitrogen followed by the addition of 647 grams of vinylidene chloride monomer and then 120 grams of vinyl chloride monomer. The admixture was stirred for a period of from about 10 to 15 minutes before the temperature of the reactor was raised to 70° C. The reaction was terminated following a period of about 65 hours. This reaction was repeated 3 times using methylcellulose levels of 76, 38 and 115 mls of 2% of methylcellulose solution in water.

Each of these polymerization reactions resulted in significant amounts of polymer being tightly adhered to the reactor walls. The coated reactor walls were then each sulfonated by first drying the reactor interior and evacuating the same to about 22 inches of Hg, followed by the addition of 0.27 grams of sulfur trioxide which was maintained within the reactor for a period of 2 minutes, during which time the polymer coating turned black in color. The reactor was then flushed with nitrogen and the sulfonated coating neutralized with 0.003N NaOH. The sulfonated reactors were then run as described supra using a methylcellulose level of 115 mls of 2% methylcellulose in water. In each instance, significantly less polymer buildup was observed following the polymerization reaction as compared to the non-sulfonated control runs. Further, the buildup which did occur did not adhere tightly to the inerior surfaces of the reactor. A total of six consecutive runs were made in each reactor utilizing a single sulfonation treatment, without excessive formation of polymer buildup on the interior surfaces of the reactors.

EXAMPLE XVII

A 3 liter glass pipe reactor was charged with 75 mls of a 1% methylcellulose solution in deionized water, 1.9 grams of lauroyl peroxide, 1301 mls of additional deionized water and 122 mls (114 grams) of vinyl acetate monomer containing 4-7 ppm of hydroquinone. The reactor was then purged with $N_2$, followed by the addition of 570 grams of vinyl chloride monomer. The contents of the reactor were polymerized utilizing a polymerization temperature of about 65° C over a 12 hour period. The polymerized mixture was removed from the reactor leaving a tightly adhered polymeric coating on the internal reactor surface. The reactor was dried and flushed with air and $N_2$ gas, then closed and evacuated to about 22 inches of Hg. Thereafter, 4.27 grams of $SO_3$ was charged into the reactor and held therein for a period of about 10 minutes. The reactor was then flushed with low pressure water. The polymeric coating on the interior surfaces of the reactor was observed to turn black in color following the treatment with $SO_3$.

The treated reactor was then used for a second polymerization reaction as described supra. It was observed that there was considerably less foaming of the reactor contents during such second polymerization reaction which result is believed to be directly attributable to the $SO_3$ treatment. Further, there was noticeably less polymer buildup on the internal reactor surfaces, as compared to the first polymerization reaction.

What is claimed is:

1. In a process for retarding undesirable buildup of polymeric material on the internal surfaces of reactors used in the polymerization of substantially water-insoluble ethylenically unsaturated monomer the steps comprising, (1) precoating said internal surfaces with an adherent, substantially water-insoluble polymeric coating, then (2) introducing sulfur trioxide into the precoated reactor prior to addition of the polymerization ingredients in an amount suffficient to provide at least about 0.045 gram of sulfur trioxide per gallon of reactor volume, then (3) flushing said reactor with water.

2. The process of claim 1 wherein said substantially water-insoluble ethylenically unsaturated monomer is selected from the group consisting of vinyl chloride, mixtures of vinyl chloride and vinylidene chloride and mixtures of vinyl chloride and vinyl acetate.

3. The process of claim 2 wherein said polymeric coating is obtained by a prior polymerization of said substantially water-insoluble ethylenically unsaturated monomers in said reactor.

4. The process of claim 3 wherein said polymeric coating is polyphenylene sulfide.

5. The process of claim 3 wherein said polymeric coating is a material composed of about 60 percent by weight of tetrahydro-1-(4-hydroxy-3-methylphenyl) thiophenium hydroxide inner salt and about 40 percent by weight of 1,1'-(isopropylidene)bis(6-hydroxy-m-phenylene)-bis(tetrahydrothiophenium hydroxide)bis-(inner salt).

* * * * *